C = 1.1.1.4.4.4-hexafluoro-2-chloro-3-methoxy-butene-(2)

B = 3,3,4,4-tetrafluoro-2-chloro-1-methoxy-cyclo-butene-(1)

United States Patent Office

3,551,395
Patented Dec. 29, 1970

3,551,395
PROCESS FOR THE MANUFACTURE OF AMORPHOUS COPOLYMERS OF ETHYLENE AND HIGHER α-OLEFINS
Helmut Schaum, Bad Soden, Taunus, and Gerhard Hörlein, Frankfurt am Main, Germany, assignors to Farbwerke Hoechst Aktiengesellschaft vormals Meister Lucius & Bruning, Frankfurt am Main, Germany, a corporation of Germany
Filed June 11, 1968, Ser. No. 736,200
Claims priority, application Germany, June 22, 1967, F 52,764
Int. Cl. C08f 15/40
U.S. Cl. 260—80.78                    13 Claims

ABSTRACT OF THE DISCLOSURE

The invention relates to a process for the manufacture of amorphous copolymers consisting of ethylene, higher α-olefins and, if desired, a small amount of a diolefin with modified organometal mixed catalysts in suspension. Alkoxy derivatives of perhalogenated open-chain or cyclic olefins are used as catalyst reactivators and the yields are so high that the complicated removal of catalyst from the polymer may be dispensed with. The products obtained are characterized by advantageous industrial properties.

---

Figure 1:
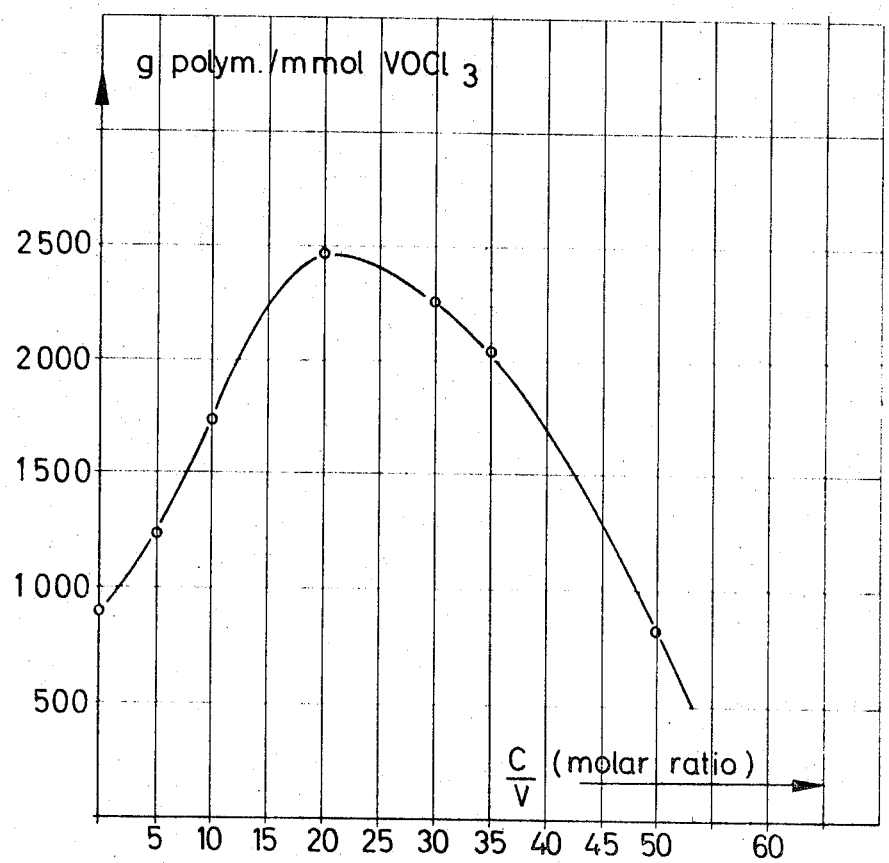

It has been proposed in Belgian specification 553,655 to prepare copolymers of high molecular weight by polymerising ethylene with a higher α-olefin in the presence of an organometal mixed catalyst, which is known as a "Ziegler catalyst" and is used in industry, at a temperature within the range of −30° C. to +150° C. under a pressure within the range of 0 atmosphere to 30 atmospheres (gauge); this process is known as low-pressure process.

When the copolymers obtained by the process mentioned above have a considerable content of higher α-olefins (more than about 25% by weight) they are amorphous and may be used as rubbers. The rubbery copolymers having a substantial content of higher α-olefin are soluble in aliphatic, aromatic and cycloaliphatic hydrocarbons and in a variety of halogenated hydrocarbons, for example, carbon tetrachloride, tetrachloroethylene and trichloroethylene. The polymerization of the mixture of monomers is in most cases carried out in such a solvent, and the copolymer is obtained as a highly viscous solution (solution polymerization).

However, the manufacture and working up of such a highly viscous copolymer solution involves the considerable disadvantage that only a relatively small quantity of copolymer can be dissolved in the solvent (about 50 to 100 g. per litre of solvent). This makes it necessary to use a substantial quantity of solvent, to stir the solvent and finally to remove it in order to isolate the copolymer.

Furthermore, a substantial amount of energy is required to stir and move these highly viscous solutions.

It has also been proposed in Belgian specification 628,-896 to manufacture amorphour copolymers of ethylene and α-olefins in the presence of a catalyst consisting of a dialkyl aluminum halide and an addition complex of a vandium halide with a Lewis base, for example with a complex of VCl$_3$, VCl$_4$ or VOCl$_3$ with diethyl ether, di-isopropyl ether, diethoxyethane, tetrahydrofuran or dioxan.

It has also been proposed to carry out the copolymerization in a liquid that does not dissolve the polymer. However, the number of dispersion media suitable for this purpose is limited because most of the proposed dispersants are polar towards these rubbery copolymers, and react with the catalyst, whereby the activity of the catalyst is lost.

As halogenated hydrocarbons suitable for the preparation of suspension of these copolymers there is proposed in British patent specification No. 849,112, for example, methylene chloride, ethyl chloride, 1,2-dichloroethane, 1,1,2-trifluorotrichloroethylene and the like.

Furthermore, British specification 925,468 proposes as solvents suitable for the preparation of suspensions of such rubbery copolymers methylene chloride, ethyl chloride and 1,2-dichloroethane and polymerization temperatures that do not exceed the boiling points of these solvents or are not over 50° C. According to this British specification working up is carried out only by extraction of the catalyst with water, after the polymerization has been stopped with alcohol or water.

Therefore, to make these expensive working-up operations unnecessary, it was very desirable to develop a process in which the utilization of the catalyst, that is to say the yield referred to the quantity of catalyst used, is increased so much that the catalyst may be left in the product and need not be extracted, that the solvent can be filtered off and then used without first having been purified for a new polymerization batch and, in addition, the bulk of the organoaluminum component remains usable for the further polymerization. However, this is only possible when the yield, referred to the quantity of catalyst used, is substantially increased.

The present invention provides a process for the copolymerization of ethylene with an α-olefin of the formula R—CH=CH$_2$, in which R represents an aliphatic linear or branched hydrocarbon radical containing fewer than 7 carbon atoms, if desired with such a quantity of a diolefin that the terpolymer contains thereof 2–8% by weight, preferably 2–4% by weight, in suspension, under a pressure from 0 to 30 atmospheres (gauge) at a temperature within the range from −30 to +50° C., with a coordination catalyst comprising a tri- to pentavalent vandium compound and an organoaluminium compound, both of which are soluble in the dispersion medium used, while stirring or otherwise mechanically stirring the reactants about, which comprises carrying out the polymerization.

(1) in the presence of a halogenated hydrocarbon as dispersion medium in which the copolymer is insoluble under the reaction conditions,
(2) with the vanadium compound in a concentration from 0.001 to 0.1 mmol per litre of dispersant,
(3) at an Al:V-ratio from 20–200, preferably from 30–100, and
(4) in the presence of an alkoxy derivative of a perhalogenated, open-chain or cyclic olefin in which at least one double bond is in the α-position to the alkoxy group.

As examples of alkoxy derivatives of perhalogenated olefins to be used in this invention the following may be mentioned:

1,1,1,4,4,4-hexafluoro-2-chloro-3-methoxy-butene-(2)

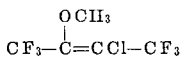
I 1,1,1,4-tetrafluoro-3-chloro-2,4,4-trimethoxy-butene-(2)

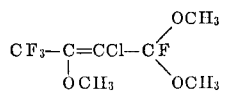
II

Perchloro-1-ethoxy-butadiene-1,3

$Cl_2C=CCl—CCl=CCl—OC_2H_5$ III 1,1,1,4-tetrafluoro-2-chloro-3,4,4-tributoxy-butene-(2)

IV 3,3,4,4-tetrafluoro-2-chloro-1-methoxy-cycylobutene-(1)

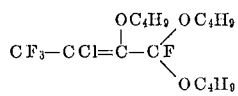
V

Perfluoro-1-methoxy-cyclobutene-(1)

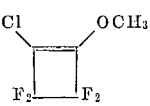
VI 3,3,4,4,5,5-hexafluoro-2-chloro-1-methoxy-cyclopentene-(1)

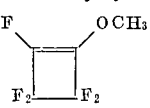
VII 3,3,4,4,5,5-hexafluoro-2-chloro-1-ethoxy-cyclopentene-(1)

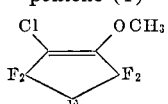
VIII

The alkoxy derivatives of the perhalogenated, open-chain or cyclic olefins may be manufactured by methods proposed in the references:

(1) A. L. Henne and K. A. Latif, J. Indian Chem. Soc. 30, 809 (1953).
(2) R. A. Shepard, H. Lessoff, J. D. Domijan, D. B. Hilton and T. F. Finnegan, J. Org. Chemistry 23, 2011 (1958),
(3) J. D. Park, C. M. Snow and J. R. Lacher, J. Amer. Chem. Soc 73, 2343 (1951), and
(4) J. T. Barr, K. E. Rapp, R. L. Pruett, C. T. Bahner, J. D. Gibson and R. H. Lafferty, Jr., J. Amer. Chem. Soc. 72, 4480 (1950), from corresponding fluoro- or chloroolefins by reaction with the appropriate molecular quantity of alcoholate (see also O. Scherer, G. Hörlein and H. Millauer, Chem. Ber. 99, pp. 1966–1972 [1966] and the German Auslegeschriften 1,224,735, 1,230,022 and 1,232,135).

The copolymerization of ethylene and the higher α-olefin, and if desired also diolefin, can be performed with a Ziegler catalyst in the presence of a Lewis base, for example, ether. However, it was surprising that certain alkoxy derivatives of perhalogenated, open-chain or cyclic olefins have a high efficiency which reactivates the catalyst and thereby increases the yield, which is in contrast to dialkyl ethers, for example, diethyl ether or halogenated dialkyl ethers, for example, 2,2′-dichlorodiethyl ether. The products obtained with this modified catalyst system display moreover advantages application properties, such as a higher vulcanization speed and better tackiness. The ready accessibility of these reactivating compounds makes them particularly suitable for this purpose.

The alkoxy derivative of perhalogenated open-chain or cyclic olefins is a constituent of the catalyst and does not become incorporated into the copolymer. Its use surprisingly generally increases the yield 3 to 4 fold when one of the above-mentioned dispersion medium is used that does not dissolve the synthetic rubber formed.

The use of these reactivators, of the indicated quantities of catalyst and of the indicated ratio of the catalyst components ensures good utilization of the catalyst and makes it possible to work up the polymerization batch anhydrously by filtration so that neither the copolymers nor the solvents (as in the proposed processes; see British specification 925,468) need be freed from water and possibly from alcohol, more especially as a very small quantity of these H-acid compounds in the recycled solvent would render the catalyst inactive. The copolymers manufactured by the present process generally have a very low content of ash ≦0.09% and of chlorine (≦600 p.p.m.).

As catalyst used for the copolymerization of ethylene with the higher α-olefin, and possibly a poly-unsaturated compound, there may be used a coordination catalyst soluble in the dispersant used, which comprises (a) a vanadium compound, for example, $VOCl_3$, $VCl_4$, vanadium triacetylacetonate, vanadium oxydiacetylacetonate, vanadium naphthenate, vanadium benzoate, or a vanadium ester, for example, $VO(i-C_4H_9)_3$, $VO(i-C_3H_7)_3$, $VO(OC_2H_5)Cl_2$, $VO(OC_2H_5)_2Cl$ and others, preferably $VOCl_3$, and (b) an organoaluminium compound having the formula $AlR_nX_{3-n}$ [in which R represents an alkyl radical, X a halogen atom and $n=1$ to 3] such as $Al_2(C_2H_5)_3Cl_3$, $Al(C_2H_5)_2Cl$, $Al(C_2H_5)Cl_2$, $Al_2(i-C_4H_9)Cl_{3,3}$,

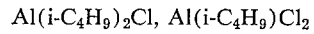

or preferably $Al_2R_3Cl_3$, or of the formula $AlR_3$, such as $Al(C_2H_5)_3$ and $Al(i-C_4H_9)_3$. Further suitable organoaluminium compounds are polymeric activators, for example, aluminium isoprenyl, (c) and, according to this invention, with addition of an alkoxy derivative of a perhalogenated open-chain or cyclic olefin.

It is a great and unexpected advantage of the process of this invention that by virtue of the extremely high activity of the above-mentioned modified Zeigler catalysts rubbery copolymers of olefins can be obtained in especially high space/time yields, as revealed in the examples hereof.

It is another advantage that the use of the modified Ziezler catalysts according to this invention—obviously because of the more uniform reaction of the olefins during the copolymerization—gives rise to products that are chemically and physically very uniform and their vulcanizates display improved mechanical properties.

The process disclosed in the above-mentioned British specification 925,468 is performed without using an alkoxy derivative of a perhalogenated open-chain or cyclic olefin as reactivator and the increased proportion of catalyst required would produce a much higher ash content when working up were carried out in anhydrous conditions, and this higher requirement of catalyst could be reduced only by an extraction with water, if necessary after inactivation with alcohol in the manner described.

According to the process of this invention the polymer can be filtered off and completely freed from solvent and the solvent can be recycled into the polymerization vessel. By this method products having a very low ash content can be obtained with a large increase in the yield. It offers the further advantage that the solvent can be reused without first having been purified so that most of the organoaluminum compound can be used in further polymerizations, and moreover the recycled α-olefins are not contaminated or diluted by the gaseous paraffin hydrocarbons formed in the course of the hitherto pratised inactivation.

The highly acitve mixed catalyst suitable for the copolymerization is advantageously formed in the polymerization vessel by introducing the solution of the vanadium compound and the solution of the organoaluminum component separately and continuously into the polymerization batch at a constant ratio. The alkoxy derivative of a perhalogenated open-chain or cyclic olefin used as reactivator can be introduced separately or in form of a preformed mixture with the vanadium compound.

The catalyst components are advantageously used in form of solutions in the above-mentioned dispersion medium in which the ethylene-α-olefin copolymer is insoluble or hardly soluble.

The molecular ratio aluminiumorganyl:vanadium compound may vary within wide limits, for example from 20 to 200. Advantageously, a ratio of 30:100 is employed.

When according to this invention an alkoxy derivative of a perhalogenated open-chain or cyclic olefin is used as reactivator, the molecular ratio of reactivator:vanadium compound used is from 5 to 50 or higher, preferably from 5 to 20.

The process of this invention, with the use of the reactivator, is performed at a concentration of 0.001 to 0.1 mmol of vanadium compound per litre of dispersion medium.

When the catalyst constituents are added continuously to the polymerization batch, and the polymerization is performed batchwise, these indications of the concentration are to be looked upon as the final concentration, that is to say these values are only reached after a certain quantity of polymer has already been formed. Compared with the process disclosed in British specification 925,468, the process of this invention requires substantially smaller catalyst concentrations. It is known that with sulphur-crosslinkable, elastic rubbery products can be obtained from these olefin copolymers when a small quantity of a doubly unsaturated compound is built into the nascent copolymer. One double bond of this diene participates in the polymerization, whereas the other double bond remains available for the subsequent vulcanization with sulphur.

As such ter-components the following may inter alia be mentioned:

1,4-cis-hexadiene, 1,4-trans-hexadiene, alkenyl-norbornenes, for example, 5-(2' and/or 3'-methyl-2-butenyl) norbornene-2, alkylidene-norbornenes, for example, 5-methylenenorbornene-2 or 5-ethylidene-norbornene-2, dicyclopentadiene, butadiene-1,3-isoprene.

To obtain a rubbery product which in the vulcanized state possesses good properties of application it is necessary to use for the polymerization homogeneously dissolved catalyst systems. The copolymerization of ethylene may be carried out with propylene, butene-1, isobutene, pentene-1, hexene-1, 4-methylpentene-1 and other branched or linear α-olefins containing fewer than 9 carbon atoms, preferably with propylene. The proportions of ethylene and propylene are generally such that copolymers having elastic, rubbery properties are obtained, that is to say the ethylene content may be 20 to 80% by weight of the copolymer, preferably 30 to 75% by weight.

The copolymerization is carried out at a temperature ranging from $-30°$ C. to $+50°$ C., preferably from $-10°$ C. to $+40°$ C., under a pressure ranging from 0 to 30 atmospheres (gauge). The polymerization may be carried out batchwise or continuously. If desired, the polymerization may be carried out in the presence of 0.0001% to 10% by weight, calculated on the dispersion medium, of a finely divided, inert solid substance, which does not inhibit the polymerizing activity, is soluble in neither the dispersion nor the precipitating polymer, has a large surface and a particle size from 0.005 to 100µ.

As such inert solid substances, for example, the following inorganic compounds are suitable:

Chlorides, for example, NaCl or KCl
Fluorides, for example, NaF, $CaF_2$, $KF-BF_3$, $2KF \cdot SiF_4$ or $Na_3AlF_6$
Sulphates, for example $K_2SO_4$, $Na_2SO_4$, $CaSO_4$, $BaSO_4$ or ylapatite
Nitrates, for example, $NaNO_3$ or $KNO_3$
Phosphonates, for example, $Ca_3(PO_4)_2$, apatite or hydroxylapatite
Carbonates, for example, $CaCO_3$, $MgCO_3$, $Na_2CO_3$, $K_2CO_3$ or $ZNCO_3$
Silicates, for example, talcum, kaolinite, $SiO_2$ in form of xerogels, diatomaceous earth, Aerosil (registered trademark)
Aluminiumsilicates, for example, feldspar or oligoclase
Aluminuates, for example spinell or zinc spinell
Borates, for example, $Na_2B_4O_7$
Oxides, for example, $Al_2O_3$, AlOOH, $Fe_2O_3$, PbO, $TiO_2$, ZnQ/CaO or MgO.

Also as such inert solid substances there may be used finely dispersed polymers, for example, polyethylene, polypropylene, poly-4-methyl-pentene-1 and polyacrylonitrile.

The dispersion medium used for the polymerization according to the present process is methylene chloride, ethylene chloride, 1,2-dichloroethane, 1,2-dichloropropane, 1,1,2-trifluorotrichloroethane or another halogenated hydrocarbon, preferably methylene chloride or 1,2-dichloroethane; the dispersant must not dissolve the copolymer under the reaction conditions.

The polymer may be crosslinked, for example, with the aid of an organic peroxide, if desired with addition of sulphur, at a temperature from 100 to 240° C. When the desired copolymer also contains diolefin units, the vulcanization may be carried out with sulphur or sulphur compounds commonly used in the rubber industry and accelerators by heating at a temperature ranging from 100 to 240° C. for a period from a few minutes to several hours.

The following examples illustrate the invention.

EXAMPLE 1 (Comparative Example)

Batchwise copolymerization of ethylene and propylene in methylenechloride at various molecular ratios of diethyl ether:vanadium oxytrichloride 1:8 litres of methylenechloride were saturated while excluding air and moisture, in a glass flask of 3 litres capacity, equipped with a perforated stainless steel paddle, 3 dropping funnels with ground stoppers, a reflux condenser with mercury relief valve attached, a gas inlet tube and a thermometer neck, at 15° C. under atmospheric pressure while stirring, with a gaseous mixture of 5 parts by volume of ethylene and 6 parts by volume of propylene. After having ensured in this manner that a monomer mixture of the appropriate composition for the manufacture of products of uniform composition was present before starting the polymerization, the methylenechloride, which had been saturated at 15° C. with ethylene and propylene at the volumetric ratio of 1:2, was mixed with 0.02 mmol of $VOCl_3$. Then ethyl aluminium sesquichloride (a solution of 20 mmols of Al in 100 ml. of methylenechloride) was added dropwise until polymerization sets in, which could be recognized by the vacuum forming in the apparatus. Then, in the course of 100 minutes, the monomer mixture (ethylene:propylene=2:1) was added until on each occasion pressure compensation has been reached, and $VOCl_3$ (0.18 mmol in 100 ml. of methylenechloride) and ethyl aluminium sesquichloride (20 mmols of Al in 100 ml. of methylenechloride) were dropped in at a uniform rate. If desired, the quantity of diethyl ether shown in Table 1 was added to the vanadium oxytrichloride solution. The copolymer settled out in form of small globules which were filtered off and dried. The The yields for the various molecular ratios of diethyl ether:vanadium oxytrichloride are shown in Table 1.

The resulting products could be vulcanized with peroxides in the usual manner and were amorphous as was revealed by differential thermoanalytic measurements.

1,1,1,4,4,4 - hexafluoro-2-chloro-3-methoxy-butene-(2) (C): vanadium oxytrichloride The procedure was as described in Example 1, except that 1,1,1,4,4,4-hexafluoro-2-chloro-3-methoxy-butene-(2)

TABLE I.—BATCHWISE COPOLYMERIZATION OF ETHYLENE PROPYLENE AT DIFFERENT MOLAR RATIOS OF DIETHYLETHER TO VANADIUMOXYTRICHLORIDE

Common reaction conditions:
Dispersion medium—methylenechloride.
Molar ratio—Al:V=100:1.
V-concentration—0.1 mMol/l.
Polym.-temperature—+15° C.

| Example | Diethylether: vanadium-oxytrichloride (molar ratio) | Yield [g.] | Catalyst utilization [g. polym./ mMol VOCl₃] | $\eta$ red [1] | Mooney viscosity ML₄ | C₃ content in polymer (percent by weight) | Percent insoluble in toluene |
|---|---|---|---|---|---|---|---|
| (Comparison Expt.): | | | | | | | |
| 1a | 0:1 | 180 | 900 | 3.5 | 120 | 35 | 0.2 |
| 1b | 5:1 | 172 | 860 | 3.08 | 107 | 38 | 0.4 |
| 1c | 10:1 | 185 | 925 | 3.5 | 132 | 37 | 0.4 |
| 1d | 15:1 | 180 | 900 | 3.7 | 130 | 39 | 0.2 |
| 1e | 20:1 | 132 | 660 | 3.2 | 111 | 40 | 0.3 |
| 1f | 30:1 | 127 | 635 | 2.6 | 70 | 39 | |

[1] $\eta$ red: reduced specific viscosity, measured at 135° C. in 0.1% decahydronaphthaline solution.

EXAMPLE 2 (Comparative Example)

Batchwise copolymerization of ethylene and propylene in methylene chloride at different molecular ratios of 2,2'-dichlorodiethyl ether (Cl—CH₂—CH₂—O—CH₂—CH₂—Cl)

The procedure was as described in Example 1, except that 2,2'-dichlorodiethyl ether instead of diethyl ether was added to the catalyst system. The yields achieved as well as the properties of the products obtained are shown in Table 2. The copolymers were amorphous as was revealed by differential thermoanalytic measurements.

TABLE 2.—BATCHWISE COPOLYMERIZATION OF ETHYLENE AND PROPYLENE AT DIFFERENT MOLAR RATIOS OF 2,2'-DICHLORO-DIETHYLETHER TO VANADIUMOXY-TRICHLORIDE

Common Reaction Conditions and Comparison Expts.—See Table I

| Example | 2,2'-dichloro diethylether: vanadium-oxytrichloride (molar ratio) | Yield [g.] | Catalyst utilization [g. polym./ mmol VOCl₃] | $\eta$ red | Mooney viscosity ML₄ | C₃ contenr in polymet (percent by weight) | Percent insoluble in toluene |
|---|---|---|---|---|---|---|---|
| 2a | 5:1 | 129 | 645 | 3.85 | 120 | 39 | 0.2 |
| 2b | 10:1 | 149 | 745 | 3.7 | 120 | 38 | 0.3 |
| 2c | 20:1 | 108 | 540 | 3.3 | 113 | 39 | 0.2 |

EXAMPLE 3

Batchwise copolymerization of ethylene and propylene in methylenechloride at different molecular ratios of

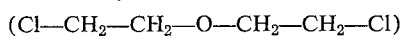

instead of diethyl ether was added to the catalyst system. The yields achieved and the properties of the products obtained are shown in Table 3. The copolymers were amorphous, as was revealed by the differential thermoanalytic measurements.

TABLE 3.—BATCHWISE COPOLYMERIZATION OF ETHYLENE AND PROPYLENE IN METHYLENE CHLORIDE AT DIFFERENT MOLAR RATIOS OF 1,1,1,4,4,4-HEXAFLUORO-2-CHLORO-3-METHOXY-BUTENE-(2):VANADIUMOXYTRICHLORIDE (CF. ALSO FIG. 1)

Common Reaction Conditions—See Table 1

| Example | C[1]:V (molar ratio) | Yield [g.] | Catalyst utilization [g. polym./ mmol VOCl₃] | $\eta$ red | Mooney viscosity ML₄ | C₃ content in polymer [Gew. percent] | Percen by weight insolublt in toluene |
|---|---|---|---|---|---|---|---|
| 3a | 0:1 | 180 | 900 | 3,5 | 120 | 35 | 0,2 |
| 3b | 5:1 | 254 | 1,270 | 3,24 | 96 | 40 | 0,3 |
| 3c | 10:2 | 346 | 1,730 | 2.7 | 95 | 40 | 0,5 |
| 3d | 20:1 | 495 | 2,475 | 3,1 | 103 | 40 | 0,3 |
| 3e | 30:1 | 452 | 2,260 | 2,8 | 83 | 42 | 0,17 |
| 3f | 35:1 | 408 | 2,040 | 2,67 | 86 | 42 | 0,4 |
| 3g | 50:1 | 267 | 835 | 3,05 | 75 | 39 | 1,0 |

[1] C =1,1,1,4,4,4-hexafluoro-2-chloro-3-methoxy-butene-(2).

EXAMPLE 4

Batchwise copolymerization of ethylene and propylene in methylenechloride at different molecular ratios of 3,3,4,4-tetrafluoro-2-chloro-1-methoxy-cyclobutene-(1): vanadium oxytrichloride.

The procedure was as described in Example 1, except that 3,3,4,4 - tetrafluoro-2-chloro-1-methoxy-cyclobutene-(1) instead of diethyl ether was added to the catalyst system. The yields achieved and the properties of the products obtained are shown in Table 4. The copolymers were amorphous, as revealed by the differential thermoanalytic measurements.

Figure 2:
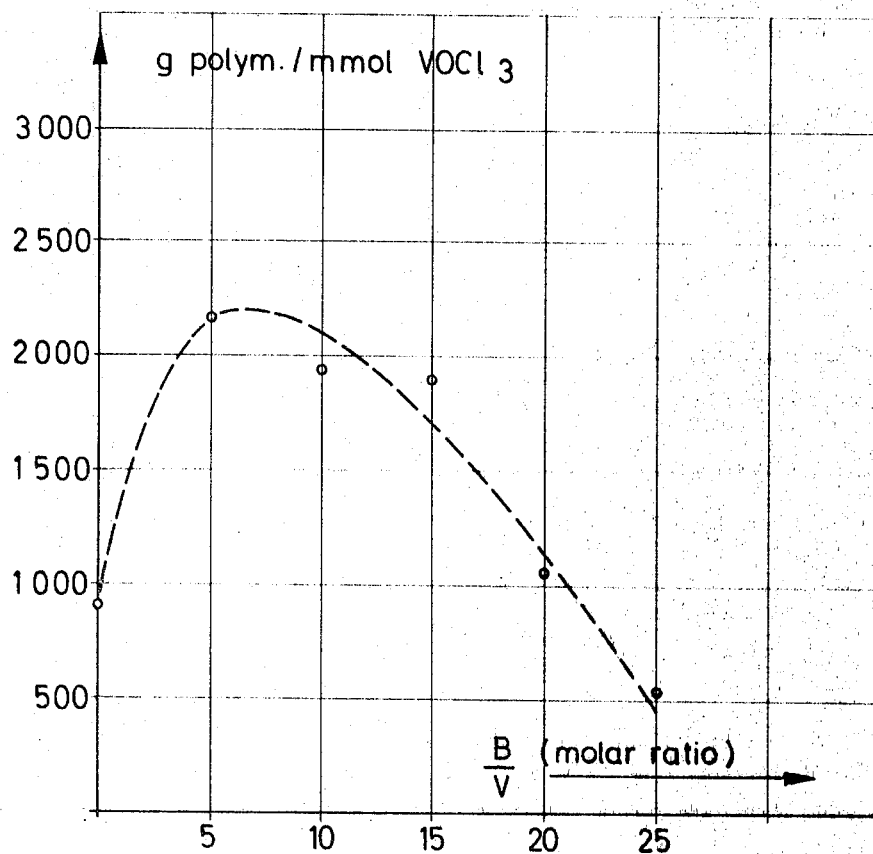

TABLE 4.—BATCHWISE COPOLYMERIZATION OF ETHYLENE AND PROPYLENE IN METHYLENECHLORIDE AT DIFFERENT RATIOS OF 3,3,4,4-TETRAFLUORO-2-CHLORO-1-METHOXY-CYCLOBUTENE-(1) (B) TO VANADIUMOXYTRICHLORIDE (CF. ALSO FIG. 2)

Common Reaction Conditions—See Table 1

| Example | B[1]:V (molar ratio) | Yield [g.] | Catalyst utilization [g. polym./ mmol VOCl₃] | η red | Mooney viscosity ML⁴ | C₃ content in polymer [Gew. percent] | Percent by weight insoluble in toluene |
|---|---|---|---|---|---|---|---|
| 4a (cf. 3a) | 0:1 | 180 | 900 | 3.5 | 120 | 35 | 0.2 |
| 4b | 5:1 | 435 | 2,175 | 2.6 | 87 | 32 | 0.3 |
| 4c | 10:1 | 388 | 1,940 | 2.95 | 109 | 41 | 0.7 |
| 4d | 15:1 | 381 | 1,905 | 2.40 | 87 | 40 | 0.8 |
| 4e | 20:1 | 213 | 1,065 | 2.6 | 62 | 40 | 0.3 |
| 4f | 25:1 | 109 | 545 | 4.5 | 76 | 39 | 1.0 |

[1] B=3,3,4,4-tetrafluoro-2-chloro-1-methoxy-cyclobutene-(1).

EXAMPLE 5

Batchwise terpolymerization of ethylene/propylene and 5-ethylidene-norbornene-2 in methylenechloride at different molecular ratios of 1,1,1,4,4,4-hexafluoro-2-chloro-3-methoxy-butene-(2) (=C):vanadium oxytrichloride The procedure was as described in Example 3, except that during the polymerization 1 ml. of a solution of 15.1 ml. of 5-ethylidene-norbornene-2 in 100 ml. of methylenechloride was dropped in while 20 litres of ethylene per hour are absorbed. This starting batch yielded an unsaturated ethylene/propylene rubber with 3.8 to 4.2 double bonds per 1000 C. (measured iodometrically) which, after vulcanization with a conventional sulphur accelerator system, formed vulcanizates having good vulcanizate properties. The resulting products further have the followng properties:

Reduced viscosity=2.8 to 3.5.
Mooney viscosity ML₄=75–120.
Propylene percent by weight in the polymer (measured by infrared-spectroscopy)=38–42.
Insoluble in toluene≤0.1% by weight.

TABLE 5.—BATCHWISE TERPOLYMERIZATION OF ETHYLENE/PROPYLENE AND 5-ETHYLIDENNORBORNENE-2 AT DIFFERENT MOLAR RATIOS OF 1,1,1,4,4,4-HEXAFLUORO-2-CHLORO-3-METHOXY-BUTENE-(2) (=C): VANADIUMOXYTRICHLORIDE

Common Reaction Conditions—See Table 1

| Example | C:V (molar ratio) | Yield [g.] | Catalyst utilization [g. polym./ mmol VOCl₃] |
|---|---|---|---|
| 5a | 0:1 | 150 | 750 |
| 5b | 5:1 | 230 | 1,150 |
| 5c | 10:1 | 335 | 1,675 |
| 5d | 20:1 | 490 | 2,450 |
| 5e | 30:1 | 430 | 2,150 |

What is claimed is:
1. A process for the copolymerization of ethylene with α-olefins of the formula R—CH=CH₂, in which R represents an aliphatic branched or linear hydrocarbon radical having less than 7 carbon atoms, if desired with small amounts of a diolefin, in suspension, under a pressure of 0 to 30 atmospheres gauge and at temperatures in the range of −30° to 50° C. in the presence of coordination catalysts consisting of tri- to pentavalent vanadium compounds and organoaluminium compounds, both being soluble in the dispersing agent used, while stirring or otherwise mechanically agitating, which process comprises carrying out the polymerization
   (a) in the presence of halogenated hydrocarbons as dispersing agents in which the copolymer is not dissolved under the reaction conditions,
   (b) with the vanadium compound in a concentration of from 0.001 to 0.1 millimol per liter of dispersing agent,
   (c) at a ratio of Al:V in the range of from 20 to 200 and
   (d) in the presence of alkoxy derivatives of perhalogenated open-chain or cyclic olefins as catalyst reactivators having at least one double bond in alpha-position to the alkoxy group.

2. A process as claimed in claim 1, wherein the ratio of Al:V in the coordination catalysts is in the range of from 30 to 100.
3. A process as claimed in claim 1, wherein the molar ratio of catalyst reactivator:vanadium compound is in the range of from 5 to 20.
4. A process as claimed in claim 1, wherein vanadium oxytrichloride is used as vanadium compound.
5. A process as claimed in claim 1, wherein ethylaluminnum sesquichloride is used as aluminum compound.
6. A process as claimed in claim 1, wherein methylenechloride is used as dispersing agent.
7. A process as claimed in claim 1, wherein 1,2-dichloroethane is used as dispersing agent.
8. A process as claimed in claim 1, wherein as catalyst reactivator 1,1,1,4,4,4-hexafluoro-2-chloro-3-methoxy-butene-(2)

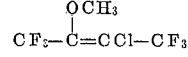

or 3,3,4,4-tetrafluoro - 2 - chloro-1-methoxy-cyclobutene-(1)

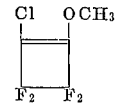

is used.
9. A process as claimed in claim 1, wherein 1,4-cis-hexadiene, 1,4-trans-hexadiene or dicyclopentadiene is used as diolefin.
10. A process as claimed in claim 1, wherein an alkenyl-norbornene is used as diolefin.
11. A process as claimed in claim 10, wherein as the alkenyl-norbornene 5-(2′-methyl-2′-butenyl-)norbornene-2 or 5-(3′-methyl-2′-butenyl-)norbornene-2 or mixtures of both compounds are used.
12. A process as claimed in claim 1, wherein an alkylidene-norbornene is used as the diolefin.
13. A process as claimed in claim 12, wherein 5-methylene-norbornene-2 or 5-ethylidene-norbornene-2 is used as alkylidene-norbornene.

References Cited
UNITED STATES PATENTS
3,380,981 4/1968 Miller _____ 260—93.7

JOSEPH L. SCHOFER, Primary Examiner
R. S. BENJAMIN, Assistant Examiner

U.S. Cl. X.R.
252—429; 260—88.2